(No Model.)  2 Sheets—Sheet 1.
H. B. BURCH.
CONVERTIBLE VEHICLE.
No. 601,551. Patented Mar. 29, 1898.
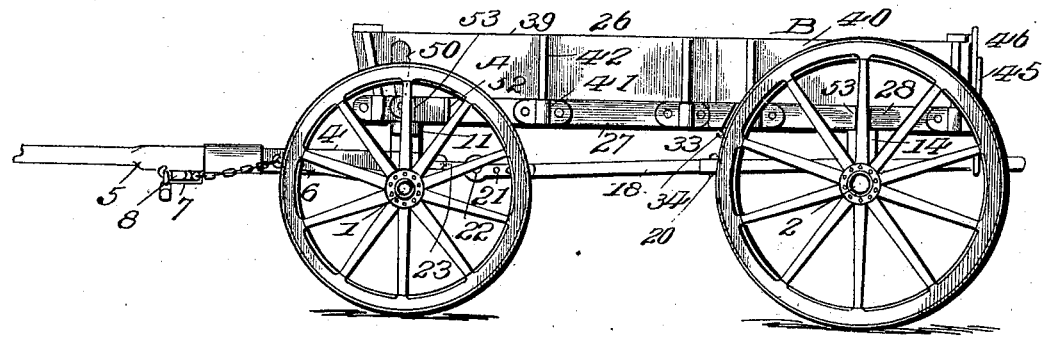
Fig. 1.
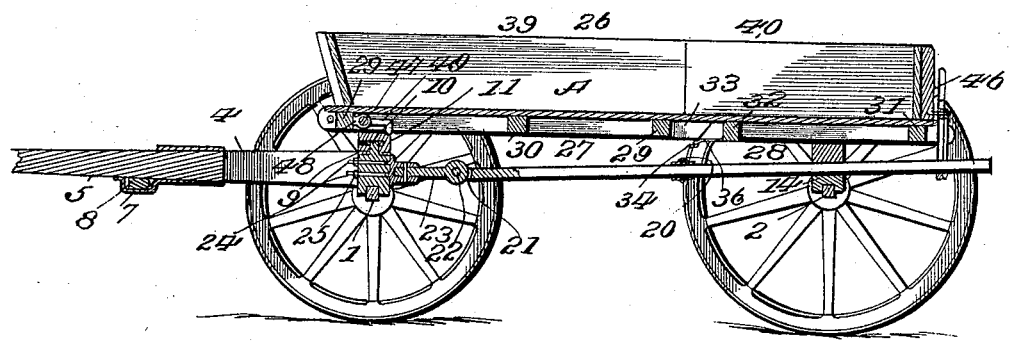
Fig. 2.
Fig. 3.
Witnesses  Inventor
H. B. Burch
By J. R. Nottingham
Attorney

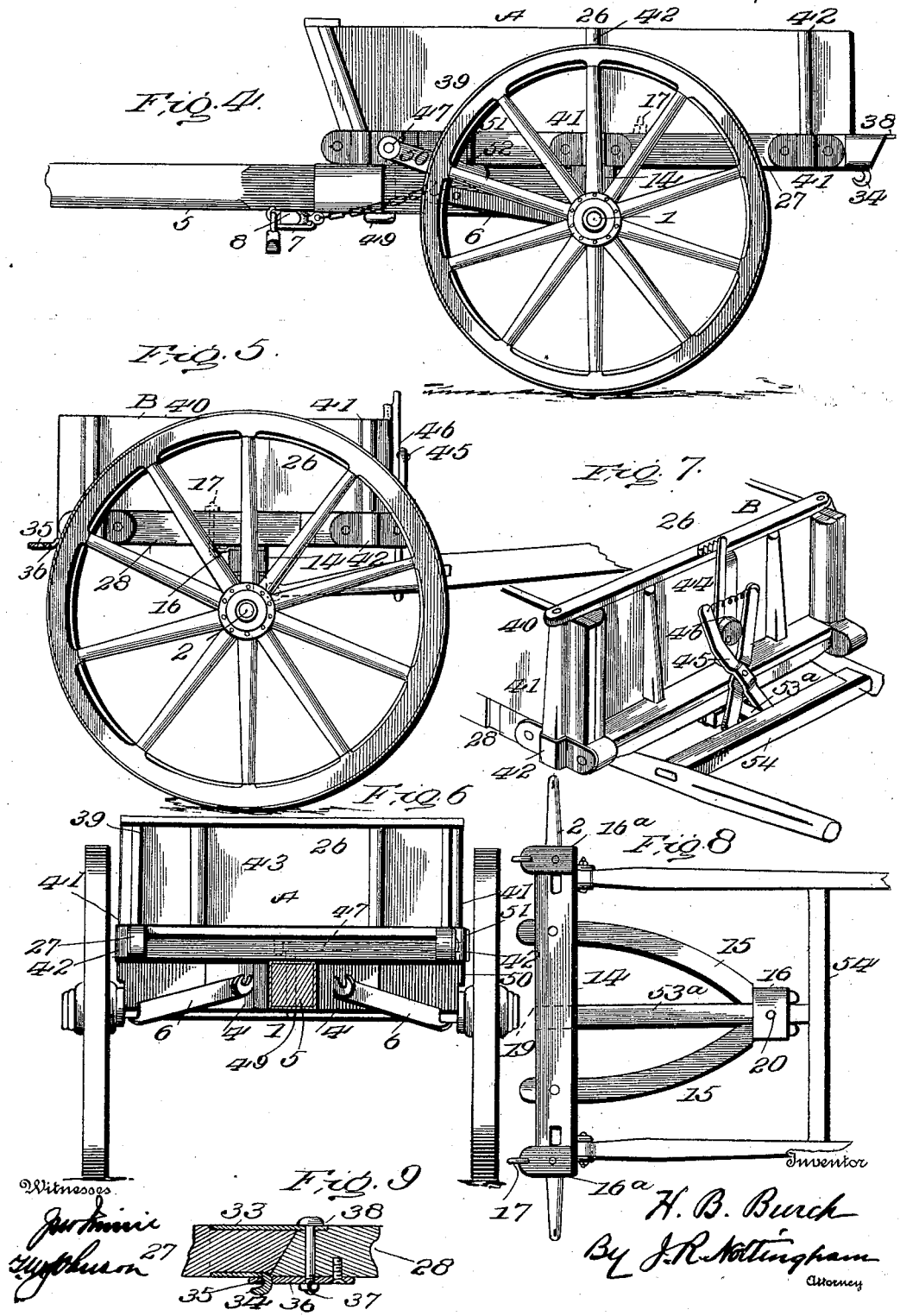

UNITED STATES PATENT OFFICE.

HENRY B. BURCH, OF WASHINGTON, DISTRICT OF COLUMBIA.

CONVERTIBLE VEHICLE.

SPECIFICATION forming part of Letters Patent No. 601,551, dated March 29, 1898.

Application filed December 13, 1897. Serial No. 661,651. (No model.)

*To all whom it may concern:*

Be it known that I, HENRY B. BURCH, a citizen of the United States, residing at Washington, in the District of Columbia, have invented certain new and useful Improvements in Convertible Vehicles; and I do hereby declare the following to be a full, clear, and exact description of the invention, such as will enable others skilled in the art to which it appertains to make and use the same.

The object of the invention is to so construct a four-wheeled wagon that it can be readily and quickly converted into two separate vehicles, each complete in itself, the one serviceable as a two-horse cart and the other as a one-horse cart; and the invention consists in the novel combination and arrangement of the various parts by means of which this object is accomplished, as will be hereinafter more fully explained, and particularly set forth in the claims.

In the accompanying drawings, Figure 1 is a side elevation of a four-wheeled wagon constructed in accordance with my invention; Fig. 2, a vertical longitudinal section of the same; Fig. 3, a top plan of the running-gear; Fig. 4, a side elevation of the forward parts of the wagon arranged as a two-horse cart; Fig. 5, a similar view showing the rear parts of the wagon arranged as a one-horse cart; Fig. 6, a front elevation of Fig. 4; Fig. 7, a perspective view of a portion of the front of Fig. 5; Fig. 8, a plan view of a pair of thills or shafts adapted to the one-horse cart, and Fig. 9 a detail sectional view of the hinge-joint connecting the two-part body.

Referring to the several views, the numeral 1 indicates the front axle, and 2 the rear axle, each of which is provided with the usual bed. The front axle is provided with two horizontal mortises 3 3, into which is fitted and properly secured the tenons of two converging bars 4 4. Between the free ends of these bars is rigidly secured the end of the pole 5. The bars 4 are suitably braced against lateral strain by means of braces 6 6, and the pole is provided with a depending stirrup 7, in which is properly secured the whiffletree 8. The bed of the front axle on its upper side is centrally provided with a plate 9, through which projects the usual king-bolt 10, on which is pivoted the bolster 11. Each end of the bed near the hub of the wheel is provided with a clip 12, which carries a hinged bolt 13, the purpose of which will be hereinafter explained.

To the bed of the rear axle is rigidly secured a bolster 14, between which bed and bolster are secured the rear ends of hounds 15, the front ends of said hounds being secured in a separated position in a metal housing 16. The bolster 14 is provided with clips 16ª, one at each end, carrying hinged bolts 17, for the purpose to be hereinafter explained.

The two axles are connected together by a detachable reach 18, the rear end of which passes between the hounds 15 and through a mortise 19 between the rear axle-bed and its bolster, and is adjustably secured by means of the pin 20, passing through holes in the housing 16 and the reach. The forward end of the reach is provided on opposite sides with eye-plates 21, between which is loosely confined by means of a pin 22 one head of a coupling-link 23, the other head of said link being similarly confined between two eyebolts 24 24, which are secured in holes passing through the bed of the front axle by means of nuts 25.

It will be noted that the heads of the coupling-link set one in a vertical plane and the other in a horizontal plane, so that when confined between their respective eyeplates and eyebolts a universal connection between the forward end of the reach and the front axle-bed is obtained, which allows a ready "cut-in" of either front wheel.

The numeral 26 indicates the body of the wagon and may be of any approved construction so long as it is capable of being divided into two separate parts, as A and B, respectively. In constructing the two-part body I make two frames composed, respectively, of the side sills 27 and 28, the former being connected together by end sills 29 and intermediate sill 30 and the latter by end sills 31 and 32. If desired, other intermediate sills may be used. These two frames are hinged and detachably secured together by providing the adjacent ends of either set of sills, preferably sills 27, with metal sockets 33, into which are received the inner ends of the other sills, or sills 28, and providing the under side of the metal sockets with rigid hooks 34, which are adapted to catch into slots 35, made in plates 36, secured to the under side of the sills 28. After being thus hinged the two frames are firmly secured together by means of bolts 37, which pass through holes in extensions 38 of the metal sockets and through the sills 28. Each frame is provided with a suitable floor and with side-boards 39 and 40, respectively, the side sills being provided with staples 41, into which are received the ends of standards 42 of said side-boards. The two-part body is provided with suitable end-boards 43 and 44, respectively, and to the end-board 44 is secured a pair of spring-pressed grippers 45, which are operated against the spring-pressure by a cam-lever 46, the use of which will be hereinafter explained. To the other end of the two-part body is secured a rock-shaft 47, which is journaled in a bearing 48 and in one of the side sills 27. The inner end of this rock-shaft is provided with a hook-arm 49 and its outer end with a lever 50, by means of which the rock-shaft is operated. Secured to the sill 27 is a plate 51, having a catch 52, which holds the end of the operating-lever when it is forced over in one direction. The object of the rock-shaft and operating-lever will be explained later on.

The two-part body is detachably secured upon the bolsters 11 and 14 in any well-known manner, preferably by side standards 53, setting into grooves made in the side sills.

Thus far I have described a four-wheeled vehicle complete provided with my improved devices or appliances, by means of which it may be converted into two separate vehicles. To separate the parts into two-wheeled carts, the two-part body is first removed and disconnected at its point of juncture by removing the bolts 38 and unhinging the frames. The bolster 11 is then removed and the reach detached from each axle. The longer part A of the two-body part is placed upon the front axle-bed and pivotally secured thereon by passing the hinged bolts 13 up through suitable holes in the side sills. The front end of the body A is secured by rocking the hook-arm under the end of the pole 5, as shown in Fig. 4, the end of the operating-lever being secured under the catch 52. Thus it will be seen that the forward part of the four-wheeled vehicle can be quickly converted into a two-horse dumping-cart complete, the hinged bolts readily allowing for dumping the body. If desired, a suitable end-gate may be provided, as in the ordinary cart.

In converting the rear part into a two-wheeled vehicle I prefer to employ a set of thills or shafts having a central bar 53ª, projecting rearwardly from the cross-bar 54. The thills are attached to the rear-axle bed in any of the well-known ways, but with the central bar 53ª passing between the hounds and through the mortise 19.

The part B of the two-part body is placed upon the rear-axle bed, with the end 44 at the front. The hinged bolts are passed up through holes in the side sills in the same manner as in mounting the front part A of the body. The body B is secured against accidental dumping by means of the spring-pressed grippers 45, which hook under the central bar 53ª, as shown in Fig. 7. When it is desired to dump the cart, the cam-lever 44 is operated in either direction to spread the grippers apart, thereby releasing their grip on the central bar, when the cart may be readily dumped.

It will thus be seen that the rear part of my four-wheeled vehicle may also be quickly converted into a two-wheeled vehicle suitable for one horse. A suitable end-gate may also be provided for the body B and used when desired.

The advantages of my invention are obvious. It enables the purchaser to have in one vehicle the use of three separate conveyances, each of which is complete in itself.

Having thus fully described my invention, what I claim, and desire to secure by Letters Patent, is—

1. In a four-wheeled vehicle, the combination with a two-part body and the front axle and wheels detachable from the rear axle and wheels, of hinged bolts for pivoting or hinging the front part of said two-part body to said front axle, and means for detachably securing the forward end of the said front part of the two-part body against accidental displacement.

2. In a four-wheeled vehicle, the combination with a body capable of being divided and the rear axle and wheels detachable from the front axle and wheels, of hinged bolts for pivoting or hinging the rear part of said divided body to said rear axle, and a detachable connection between the end of the said rear part of the divided body and central bar of a set of thills.

3. In a four-wheeled vehicle, the combination with a two-part body and the front axle and wheels detachable from the rear axle and wheels, of hinged bolts for pivoting the front part of said two-part body to the said front axle, and a rock-shaft having an arm and an operating-lever, whereby the end of said front part of the two-part body may be connected to or disconnected from the pole connections.

4. In a four-wheeled vehicle, the combination with a two-part body and a detachable reach, of means for pivoting the front part of the two-part body to the front axle, means for hinging the rear part of said two-part body to the rear axle, and means whereby said front and rear parts may be converted into two separate dumping-carts.

5. In a four-wheeled vehicle, the combination with a two-part body, capable of being separated, each part mounted upon an axle, of means for hinging or pivoting each part to its particular axle, and means whereby said each part may be converted into a separate vehicle.

In testimony whereof I affix my signature in the presence of two witnesses.

HENRY B. BURCH.

Witnesses:
H. R. HOWENSTEIN,
J. R. NOTTINGHAM.